3,097,997
BISORGANOPHOSPHORUS ESTERS AND THEIR
PREPARATION
Karoly Szabo, Yonkers, N.Y., and John G. Brady, Campbell, Calif., assignors to Stauffer Chemical Company, New York, N.Y., a corporation of Delaware
No Drawing. Filed Nov. 7, 1961, Ser. No. 150,624
8 Claims. (Cl. 167—22)

This invention relates to bisorganophosphorus esters and, in particular, to bisesters of phosphonothioic acid in which two phosphonothioic acid residues are connected through their sulfur atoms by a thioalkylene bridge. The invention is also concerned with biocidal compositions, including their preparation and which have, as the active component thereof, at least one of the aforementioned bisesters of phosphonothioic acid.

The bisphosphonothioic esters as contemplated herein can be generally depicted by the following formula:

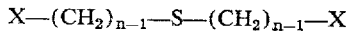

wherein R and $R_1$ refer to lower alkyl radicals preferably those having from 1 to 4 carbon atoms and $n$ is an integer of from 2 to 3. The alkyl groups include both normal and branch chains and may be alike or different. Illustrative compounds falling within the ambit of the above depicted formula include the following specific structures:

Compound 1
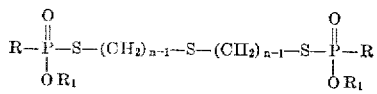

Compound 2
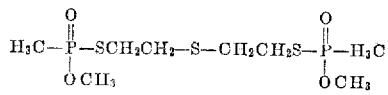

Compound 3
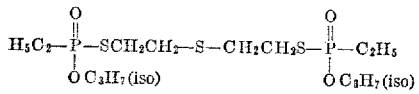

Compound 4
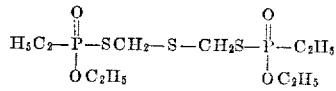

Compound 5
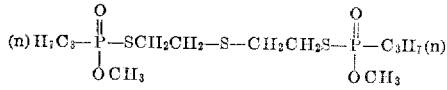

Compound 6
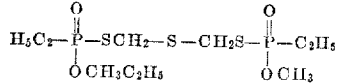

Compound 7
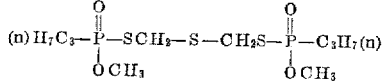

Compound 8
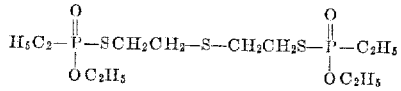

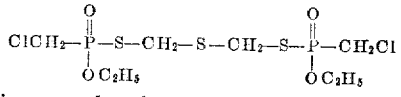

The bisorganophosphorus esters of this invention are susceptible to a generalized method of preparation which comprises condensing, preferably in the presence of a basic condensing agent, about one mole of a dihalodialkylsulfide of the following formula:

$$X-(CH_2)_{n-1}-S-(CH_2)_{n-1}-X$$

wherein $n$ has the significance previously designated and X represents a halogen atom, i.e. chlorine, bromine and the like with about 2 moles of a lower alkyl ester of phosphonothioic acid. The reaction is schematically indicated by the following equation:

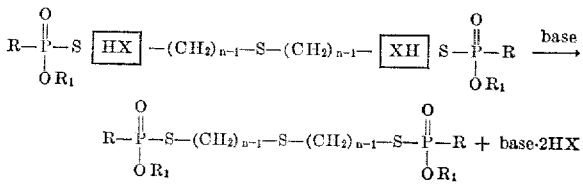

wherein X, R, $R_1$ and $n$ have the meaning previously defined. It has been our finding that generally excellent results and yields are obtained by heating the phosphonothioic acid and dihalodialkylsulfide in approximately 2 to 1 molar ratios in a relatively inert normally liquid organic solvent in the presence of a tertiary amine as the basic condensing agent. Suitable solvent mediums are exemplified by liquid aromatic hydrocarbons such as benzene, toluene, xylene etc., saturated aliphatic hydrocarbons such as hexane, heptane, cyclohexane etc. and saturated aliphatic ethers. Basic condensing agents which have been found satisfactory for effecting the reaction include basic organic amines, preferably tertiary amines as represented by the lower trialkylamines, e.g. trimethylamine, triethylamine etc., tertiary heterocyclic amines such as pyridine, picoline, quinoline, etc., inorganic bases and basic salts, e.g. alkali metal carbonates, e.g. sodium carbonate, potassium carbonate and the like. In some instances the reaction is advantageously performed in a medium capable of functioning both as a solvent and as the basic condensing agent. Pyridine and quinoline are examples of such dual purpose solvents.

Reference is now made to the following examples which are presented for the purpose of illustration only since variations in practicing the invention without departing from the spirit or scope thereof will be apparent to those skilled in the art to which the said invention pertains.

EXAMPLE 1

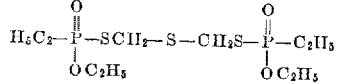

11.4 g. (0.2 M) of potassium hydroxide was dissolved in 25 ml. of water and the resulting solution combined with a mixture of 50 ml. of alcohol and 12.5 ml. of water. To this was added with stirring 0.1 M of O-ethyl ethylphosphonochloridothioate. A spontaneous reaction occurred which gradually subsided as the addition was completed. The reaction mixture was maintained at 65–70° C. for one hour, after which period 6.6 g. (0.05 M) of bischloromethylsulfide was introduced and the resulting mixture refluxed for 10 minutes. After the contents of the flask had cooled to room temperature, 250 ml. of water was next introduced and the aqueous solution extracted three times with fresh portions of benzene. The organic extracts were combined, dried over anhydrous calcium sulfate, treated with charcoal and filtered. The benzene was removed under reduced pressure leaving a residual oily product corresponding in structure to the above depicted formula and having a refractive index of 1.4928 at 25° C.

EXAMPLE 2

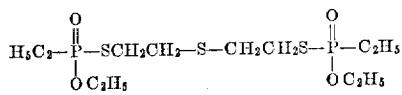

This preparation was patterned after the procedure of the first example except that bisdichloroethylsulfide (mustard gas) was used instead of the bischloromethylsulfide of the previous example. There was obtained an almost colorless oil having a refractive index of 1.5160 at 25° C. The chemical constitution of the product corresponded to the structural formula as above depicted.

EXAMPLE 3

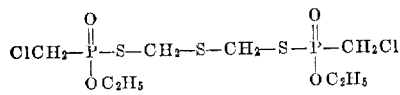

Using approximately 2 moles of O-ethyl chloromethylphosphonochloridothioate and one mole of bischloromethylsulfide, the procedure of the previous examples was carried out. There resulted an oily product, having a chemical structure corresponding to the above given formula. The results and yields of this example, generally, coincided with those obtained with the previous examples.

As stated elsewhere herein, the organophosphorus esters of this invention are eminently useful and suitable for combating a variety of pests of the type which fall in the lower orders of classification and which are exemplified by cockroaches, milkweed bugs, confused flour beetles, house flies, two-spotted mites and the like. It is to be understood that the toxicants of the invention may be used directly on the adult pest organism or, in some instances, applied to the eggs. In either case, the end result is to eradicate or control the pest organism.

As those in the art are well aware, various techniques are available for incorporating the active component or toxicant in suitable pesticidal compositions. Thus pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cotton seed and so forth.

Liquid compositions are also useful and normally comprise a dispersion of the toxicant in a liquid media. For instance, it may be convenient to dissolve the toxicant directly in a solvent such as kerosene, fuel oil, xylene, alkylated naphthalenes or the like and use such organic solutions directly. However, it is more common procedure to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthalene, sulfonate, sodium alkyl naphthalene sulfonate, methyl cellulose, polyoxyethylene, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

Other adjuncts may be resorted to in compounding biocidal formulations based on the herein described organophosphorus esters and, in this connection, reference is made to adhesives, spreaders, activators, fertilizers and the like. The preparation of pesticidal compositions incorporating the organophosphorus esters of this invention and the results of testing such compositions are spelled out in the following test procedures:

*Acaricidal evaluation test.*—The two-spotted mite, *tetranychus telarius* (Linn.), is employed in tests for acaricides. Young pinto bean plants are infested with several hundred mites. Dispersions of test compounds are prepared by dissolving 0.1 gram of the toxic material in ten milliliters acetone. This solution is then diluted with water containing 0.015% Vatsol (sodium salt of isopropylnaphthalene sulfonate) and 0.005% Methocel (methylated cellulose) as emulsifiers, the amount of water being sufficient to give concentrations of active ingredient ranging from 0.25% to 0.005%. The test suspensions are then sprayed on the infested pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the columns "2 SM" and "2 SM eggs" on the table below.

*Insecticidal evaluation tests.*—Four insect species are subjected to evaluation tests for insecticides:

(1) American cockroach (AR), *Periplaneta americana* (Linn.)
(2) Milkweed bug (MWB), *Oncopeltus fasciatus* (Dallas)
(3) Confused flour beetle (CFB), *Tribolium confusum* (Duval)
(4) House fly (HF), *Musca domestica* (Linn.)

The procedure for insects is similar to the miticidal testing procedure. Test insects are caged in cardboard mailing tubes 3⅛" in diameter and 2⅝" tall. The cages are supplied with cellophane bottoms and screened tops. Ten to twenty-five insects are used per age. Food and water are supplied in each cage. The confused flour beetles are confined in petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are calculated using well known procedures, and reported on the table below.

| Compound | House fly, μg. | American Roach, percent | Milkweed Bug, percent | Confused flour beetle, μg. | 2-Spotted mite, percent | 2-Spotted mite eggs, percent | Salt Marsh Caterpillar, percent | 2-Spotted mite Systemic, p.p.m. |
|---|---|---|---|---|---|---|---|---|
| 3 | {<50 / >10} | .05 | .01 | {<50 / >10} | .01 | {<.05 / >.01} | .1 | <1 |
| 7 | 10 | .1 | .1 | 0 | .005 | {<.01 / >.005} | 0 | <1 |

We claim:
1. A bisorganophosphorous ester of the following general formula:

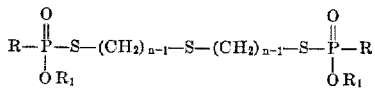

wherein R and $R_1$ represent lower alkyl radicals and $n$ is an integer of from 2 to 3.

2. A bisorganophosphorus ester of the following formula:

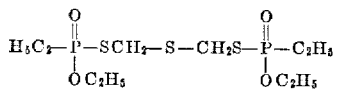

3. A bisorganophosphorus ester of the following formula:

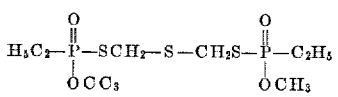

4. A bisorganophosphorus ester of the following formula:

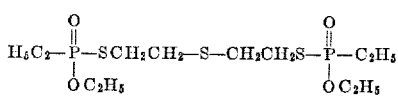

5. A method of killing pests which comprises applying to a pest habitat a small but effective amount of a bisorganophosphorus ester having the following general formula:

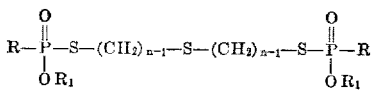

wherein R and $R_1$ represent lower alkyl radicals and $n$ is an integer of from 2 to 3.

6. A method of killing pests which comprises applying to a pest habitat a small but effective amount of a bisorganophosphorus ester of the following formula:

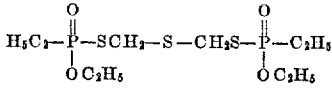

7. A method of killing pests which comprises applying to a pest habitat a small but effective amount of a bisorganophosphorus ester of the following formula:

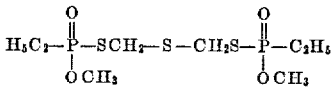

8. A method of killing pests which comprises applying to a pest habitat a small but effective amount of a bisorganophosphorus ester of the following formula:

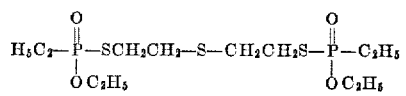

References Cited in the file of this patent
UNITED STATES PATENTS 2,653,161    Ballard et al. _____ Sept. 22, 1953

FOREIGN PATENTS 515,666       Canada _____ Aug. 16, 1955
1,190,783    France _____ Oct. 15, 1959

UNITED STATES PATENT OFFICE
CERTIFICATE OF CORRECTION

Patent No. 3,097,997            July 16, 1963

Karoly Szabo et al.

It is hereby certified that error appears in the above numbered patent requiring correction and that the said Letters Patent should read as corrected below.

Column 1, lines 50 to 54, compound 5, the formula should appear as shown below instead of as in the patent:

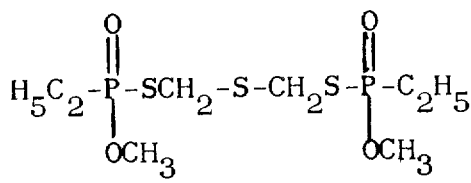

Column 4, line 47, for "age" read -- cage --; column 5, lines 18 to 22, the formula should appear as shown below instead of as in the patent:

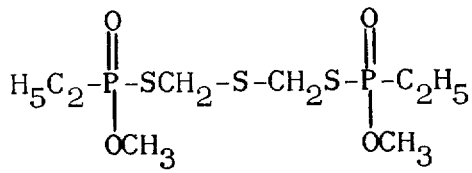

Signed and sealed this 21st day of January 1964.

(SEAL)
Attest:
ERNEST W. SWIDER

Attesting Officer

EDWIN L. REYNOLDS

Acting Commissioner of Patents